United States Patent [19]

Nokubo

[11] Patent Number: 5,531,573
[45] Date of Patent: Jul. 2, 1996

[54] PUMP AND MOTOR INTERPOSED RUBBER SEALING GASKET HAVING PLURAL GUIDE PROTRUSIONS

[75] Inventor: Seiji Nokubo, Itami, Japan

[73] Assignee: Sumitomo Electric Industries, Ltd., Osaka, Japan

[21] Appl. No.: 501,678

[22] Filed: Jul. 12, 1995

[30] Foreign Application Priority Data

Jul. 13, 1994 [JP] Japan .................................. 6-161102

[51] Int. Cl.⁶ .............................. F04B 53/22; F16J 15/02
[52] U.S. Cl. ........................ 417/360; 277/11; 277/189
[58] Field of Search ........................ 417/360, 423.11; 277/189, 11, 136

[56] References Cited

U.S. PATENT DOCUMENTS

| | | | |
|---|---|---|---|
| 2,633,804 | 4/1953 | Bruce | 417/423.11 |
| 3,545,892 | 12/1970 | Zimmermann | 417/360 |
| 4,101,138 | 7/1978 | Gaggiano | 277/11 |
| 4,436,310 | 3/1984 | Sawabe et al. | 277/11 |

FOREIGN PATENT DOCUMENTS 607613  10/1960  Canada .................. 417/360

*Primary Examiner*—Richard E. Gluck
*Assistant Examiner*—Roland G. McAndrews, Jr.
*Attorney, Agent, or Firm*—Wenderoth, Lind & Ponack

[57] ABSTRACT

A brake fluid pressure controller including a hydraulic unit having a housing and a pump mounted in the housing, and a motor for the pump having an end cover and an output shaft received in a hole formed in the housing. The motor is coupled to the housing by means of a plurality of bolts extending through the end cover of the motor and threaded into the housing. A seal member is sandwiched between opposing surfaces of the motor and the housing to seal the space around the output shaft and the space around each bolt. The seal member is in the form of a rubber packing including a large-diameter annular seal portion surrounding the output shaft and small-diameter annular seal portions integrally formed along the outer edge of the large-diameter annular seal portion.

4 Claims, 3 Drawing Sheets

PUMP AND MOTOR INTERPOSED RUBBER SEALING GASKET HAVING PLURAL GUIDE PROTRUSIONS

BACKGROUND OF THE INVENTION

The present invention relates to a brake fluid pressure controller with a motor-driven hydraulic pump necessary for antilock control and track control of vehicle wheels, and more specifically to a brake fluid pressure controller having an improved structure for sealing between the pump-driving motor and the housing of a hydraulic unit coupled to the motor.

This type of brake fluid pressure controller has an electric motor for driving the hydraulic pump mounted in the housing of the hydraulic unit. The motor is directly mounted on the housing. As disclosed in Unexamined Japanese Utility Model Publication 4-86063, the motor is usually fixed to the housing by inserting through bolts through the rear end cover of the motor and the space between a rotor and a yoke, and threadably engaging the housing.

The brake fluid pressure controller is mounted in the engine room of a car. If the controller is mounted at a lower part of the engine room, the controller must be highly waterproof. It is possible to completely seal the rear portion of the motor by forming the end cover of the motor and the cylindrical portion of the yoke as an integral member, or by welding the end cover to the cylindrical portion of the yoke. What is difficult a seal is to seal the contact area between the housing of the hydraulic unit and the motor.

Heretofore, in order to completely seal the contact area and thus to improve the waterproofness of the entire controller, the opposite surfaces of the motor and the housing were brought into contact with each other after increasing their flatness by cutting. But with this method, it is practically impossible to perfectly seal the contact area because it is difficult to obtain flat surfaces by cutting. Thus, water may infiltrate into the contact area between the housing and the motor, and then into the motor through gaps around the through bolts and the output shaft of the motor, or into the housing through a hole formed in the housing for receiving the output shaft of the motor.

In order to make the housing/motor interface more watertight, as shown in FIG. 3, it was necessary to provide seal rings 8 such as 0-rings to seal any gap around the output shaft 5 of the motor and the through bolts 7.

If the seal rings 8 are used, it is necessary to form seating grooves 9 by cutting to receive the seal rings 8 in the housing 3 of the hydraulic unit 2 to protect the seal rings by limiting their interference. Further, mounting mount a plurality of seal rings one by one is a troublesome and timeconsuming job. Since many rings are used, some of are frequently omitted by oversight.

An object of the present invention is to provide a brake fluid pressure controller which has a seal member which can be mounted easily and reliably.

SUMMARY OF THE INVENTION

According to the present invention, a brake fluid pressure controller including a hydraulic unit having a housing and a pump mounted in the housing, and a motor for driving the pump, the motor having an end cover and an output shaft received in a hole formed in the housing, and being coupled to the housing by means of a plurality of through bolts extending through the end cover of the motor and threaded into said housing, and a seal member sandwiched between opposite surfaces of the motor and the housing to seal the space around the output shaft and the space around each through bolt, the seal member being in the form of a rubber packing having a large-diameter annular seal portion surrounding the output shaft and small-diameter annular seal portions integrally formed along the outer edge of the large-diameter annular seal portion, each surrounding a respective through bolt.

Since the rubber packing is not so thick, it is not necessary to form a deep recess to limit the interference of the packing, if such a recess is needed. A shallow recess can be formed in the front end cover of the motor by pressing.

The rubber packing may have a plurality of protrusions on one side thereof which are received in holes formed either in the front end cover of the motor or in the housing of the hydraulic unit. The protrusions make the packing easier to position packing.

The use of a single, one-piece seal member leads to a reduced number of assembling steps. It is improbable that an assembly worker may forget to mount such a one-piece seal member on the controller.

By forming the recess for receiving the rubber packing in the front end cover of the motor by pressing, it is possible to eliminate the necessity of forming seating grooves by cutting, which is more troublesome and thus more costly.

By providing the rubber packing with protrusions and fitting them in holes formed in the hydraulic unit or the motor, the rubber packing can be set in position beforehand and is less likely to drop out once fitted in position, so the motor can be coupled more easily to the hydraulic unit.

Other features and objects of the present invention will become apparent from the following description made with reference to the accompanying drawings, in which:

DETAILED DESCRIPTION OF THE PREFERRED EMBODIMENT

Figure 1A:
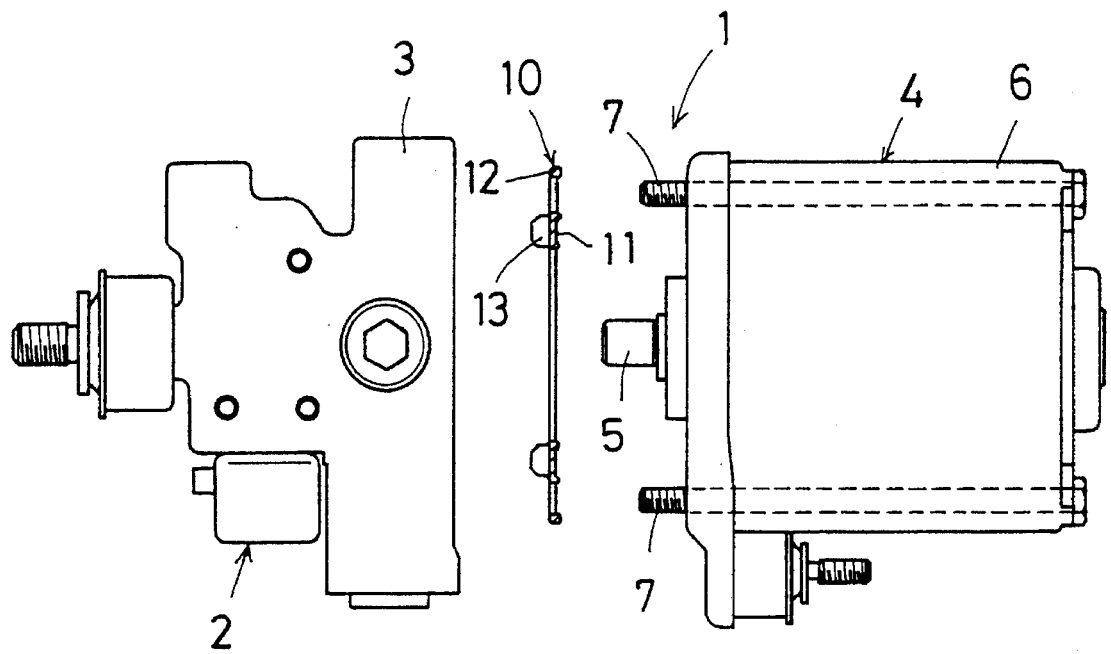
FIG. 1A is a side view of a brake fluid pressure controller according to the present invention, with the motor not coupled to the hydraulic unit.
Figure 1B:
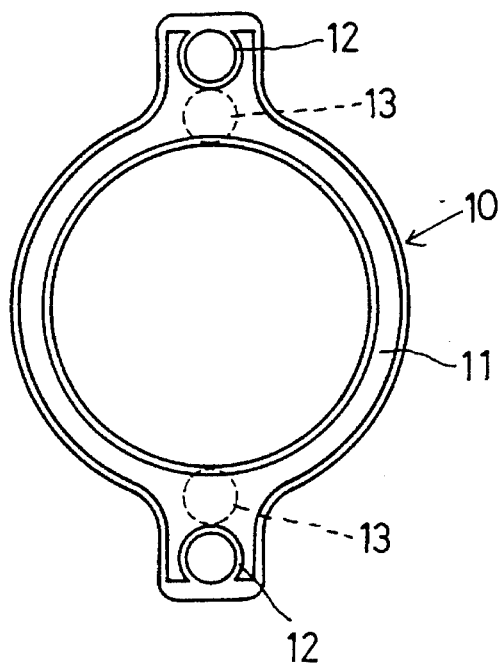
Fig. 1B is a plan view of the rubber packing.

FIG. 1 shows a brake fluid pressure controller 1 embodying the present invention. It comprises a hydraulic unit 2 and a motor 4 directly coupled to the hydraulic unit 2.

The hydraulic unit 2 has a hydraulic pump mounted in a housing 3. The hydraulic unit also has a fluid passage connecting the master cylinder with wheel brakes, a fluid passage connecting the wheel brakes with a buffer chamber, a fluid passage connecting the pump outlet with the master cylinder, and solenoid valves for increasing, holding and reducing wheel brake pressures by opening and closing the fluid passages. The hydraulic unit 2 is conventional, and may further include a fluid flow control valve in the housing 3. The above mentioned buffer chamber may also be provided in the housing 3. In FIG. 1 and all the other figures, the elements in the housing are not shown.

The motor 4 has an output shaft 5 received in a hole formed in the housing 3 and is coupled to the hydraulic unit 2 by through bolts 7 (in the embodiment, two through bolts are provided in a diametrically opposite relations). The belts are inserted through a rear end cover of a yoke 6 and the space between the cylindrical portion of the yoke and the rotor and threadedly engaged in threaded holes formed in the housing 3.

The motor 4 and the housing 3 abut each other through a rubber packing 10, the main characterizing feature of the present invention. The rubber packing 10 includes a large-diameter, annular seal portion 11 for sealing the space around the output shaft 5, small-diameter annular seal portions 12 integrally formed along the outer edge of the seal portion 11 to seal the space around the individual bolts 7, and a total of two protrusions 13 provided on one side of the packing 10 facing the housing 3 at a position between the annular seal portion 11 and the annular seal portions 12.

Figure 1C:
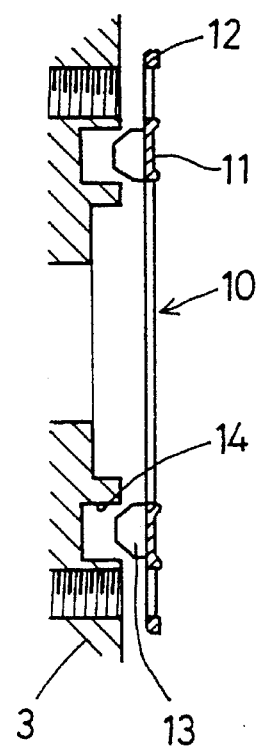
FIG. 1C is a sectional view showing how the rubber packing is mounted on the housing of the hydraulic unit.
Figure 3A:
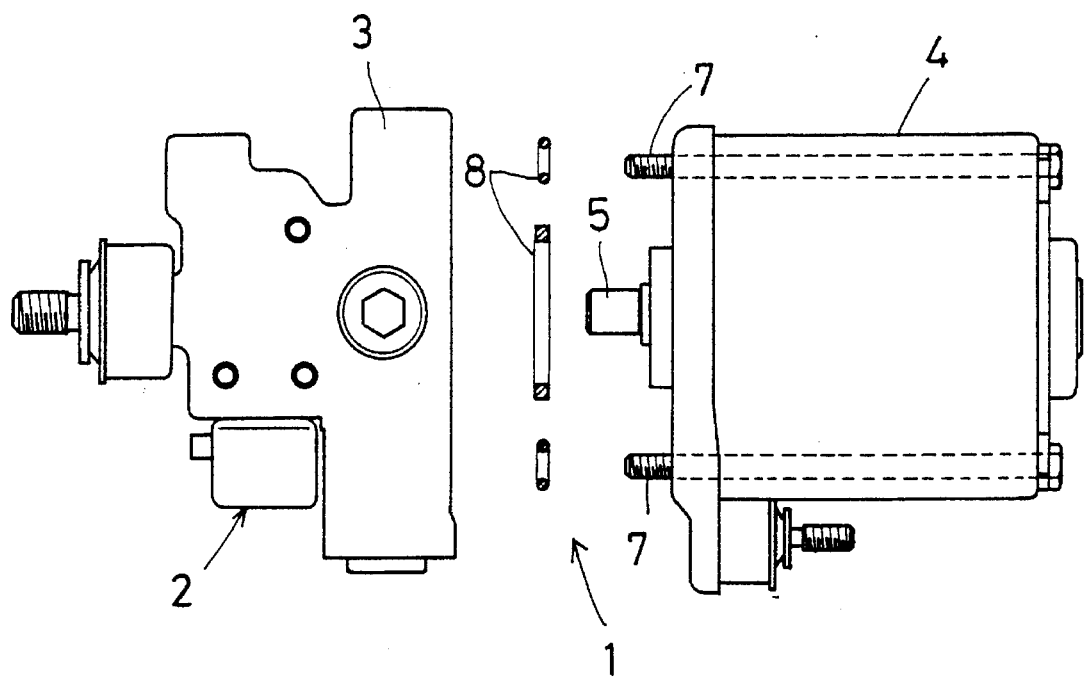
FIG. 3A is a side view of a brake fluid pressure controller having a conventional sealing structure.
Figure 3B:
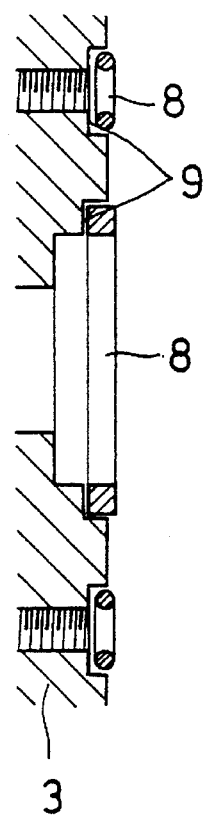
FIG. 3B is a sectional view of the same illustrating how the seal ring is mounted.

As shown in FIG. 1C, the housing 3 is formed with holes 14 for receiving the protrusions 13. The packing 10 may have more than two protrusions 13. But two protrusions 13 will be enough to hold the rubber packing 10 in position. Too many protrusions 13 would only increase the complexity of the packing and the trouble of forming holes 14.

Figure 2A:
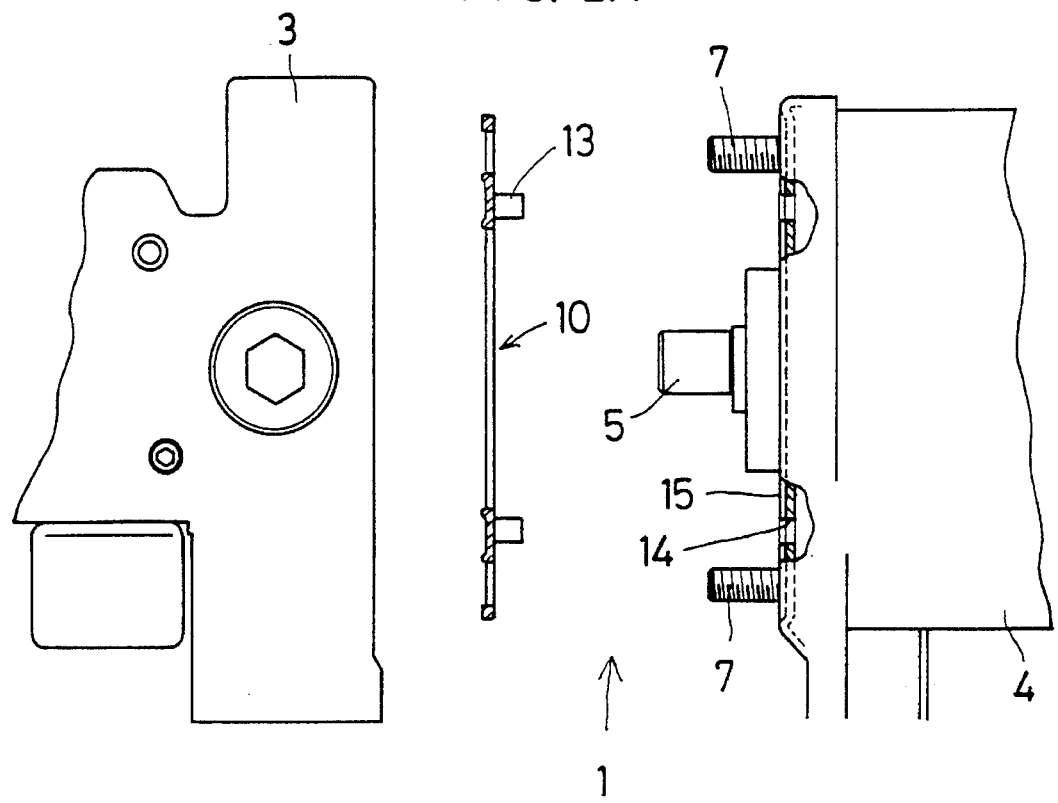
FIG. 2A is a partially cutaway side view showing the state before the rubber packing is mounted on the housing of the hydraulic unit.
Figure 2B:
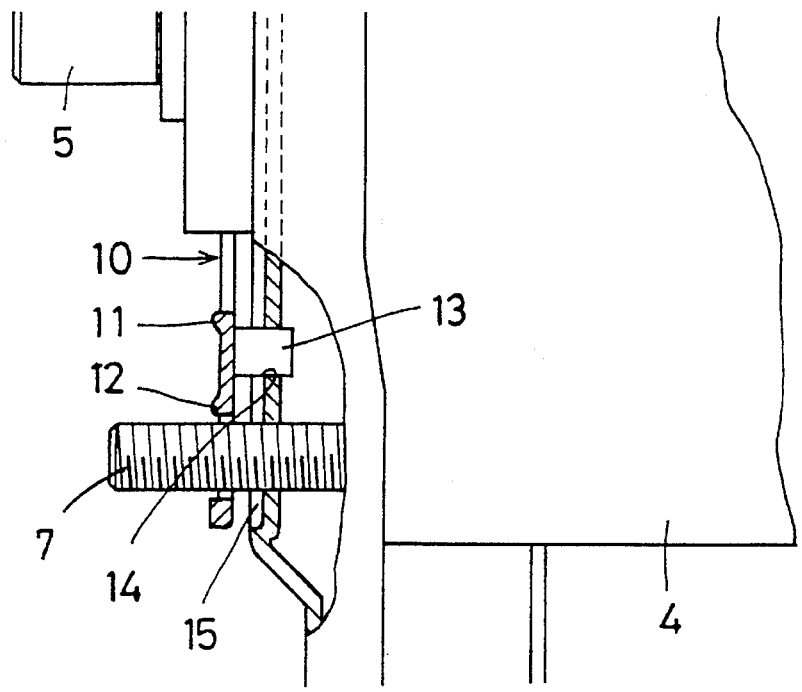
FIG. 2B is a partially cutaway enlarged side view showing the state after it is mounted on the housing.

As shown in FIG. 2A and Fig. 2B, the protrusions 13 may be formed on the side of the packing facing the motor 4 to be press-fit into holes 14 formed in the front end cover of the motor. Also, a recess 15 may be formed in the front end cover of the motor to receive the rubber packing 10 therein. With this arrangement, it is possible to prevent the rubber packing from being pressed too tightly.

What is claimed is:

1. A brake fluid pressure controller comprising:
   a hydraulic unit including a housing, a pump mounted in said housing, and an end face having a plurality of holes formed therein;
   a motor operatively engaging said pump, said motor having an end cover, an end face opposing said end face of said housing, and an output shaft received in said housing, said motor being coupled to said housing by a plurality of bolts extending through said end cover of said motor and engaging said housing; and
   a rubber seal positioned between said opposing end faces of said motor and said housing,
   said seal including a large diameter annular seal portion surrounding said output shaft,
   a plurality of small diameter annular seal portions integrally connected to the periphery of said large diameter annular seal portion, wherein each of said small diameter annular seal portions surround one of said bolts, and
   a plurality of protrusions on a side of said rubber seal facing said housing, wherein said protrusions are received in said holes formed in said housing end face.

2. The brake fluid pressure controller as claimed in claim 1, wherein said motor end face has a recess which is engaged by said rubber seal.

3. A brake fluid pressure controller comprising:
   a hydraulic unit including a housing, a pump mounted in said housing, and an end face;
   a motor operatively engaging said pump, said motor having an end cover, an end face opposing said end face of said housing, a plurality of holes formed in said end face, and an output shaft received in said housing, said motor being coupled to said housing by a plurality of bolts extending through said end cover of said motor and engaging said housing; and
   a rubber seal positioned between said opposing end faces of said motor and said housing,
   said seal including a large diameter annular seal portion surrounding said output shaft,
   a plurality of small diameter annular seal portions integrally connected to the periphery of said large diameter annular seal portion, each of said small diameter annular seal portions surrounding one of said bolts, and
   a plurality of protrusions on a side of said rubber seal facing said motor, said protrusions being received in said holes formed in said end face of said motor.

4. The brake fluid pressure controller as claimed in claim 3, wherein said motor end face has a recess which is engaged by said rubber seal.

* * * * *